Nov. 12, 1940.                G. KUNKLE                    2,221,589
                        ORE CONCENTRATING MACHINE
                         Filed Dec. 7, 1938          3 Sheets-Sheet 1

WITNESSES                                            INVENTOR
                                                  George Kunkle
                                              BY
                                                        ATTORNEYS Nov. 12, 1940.  G. KUNKLE  2,221,589
ORE CONCENTRATING MACHINE
Filed Dec. 7, 1938   3 Sheets-Sheet 3

WITNESSES

INVENTOR
George Kunkle
BY
Munn, Anderson & Liddy
ATTORNEYS

Patented Nov. 12, 1940

2,221,589

UNITED STATES PATENT OFFICE 2,221,589

ORE CONCENTRATING MACHINE

George Kunkle, Grand Junction, Colo.

Application December 7, 1938, Serial No. 244,328

2 Claims. (Cl. 209—464)

This invention relates to concentrating machines which may be used for various purposes, but which is used particularly for concentrating natural ores through the use of the floatation method, an object being to provide a construction which is simple and yet will act on the ore to separate desirable material from undesirable material.

Another object of the invention is to provide a concentrating machine which may be used for concentrating certain types of natural ores and also in the counter-current leaching of ores and residues in hydrometallurgical and chemical operations.

A further object of the invention is to provide a continuously functioning machine for the separation of materials of different hardness and different specific gravities by the use of water, the use of water and oil, or the use of other flotation reagents.

An additional object is to provide a machine provided with a plurality of feeding, scraping and grinding members which function with water or other reagent so as to cause the tailings or residues to be discharged out of one end while the floated material or the valuable products are discharged out of the opposite end.

In the accompanying drawings—

Fig. 4a is a detail fragmentary sectional view through Fig. 4 approximately on the line 4a—4a;

Fig. 5 is a detail perspective view of a wooden supporting block embodying certain features of the invention;

Fig. 6 is a detail perspective view of a second wooden block embodying certain features of the invention;

Fig. 7 is a perspective view of the metal end cap and shaft shown in Fig. 1.

Figure 1:
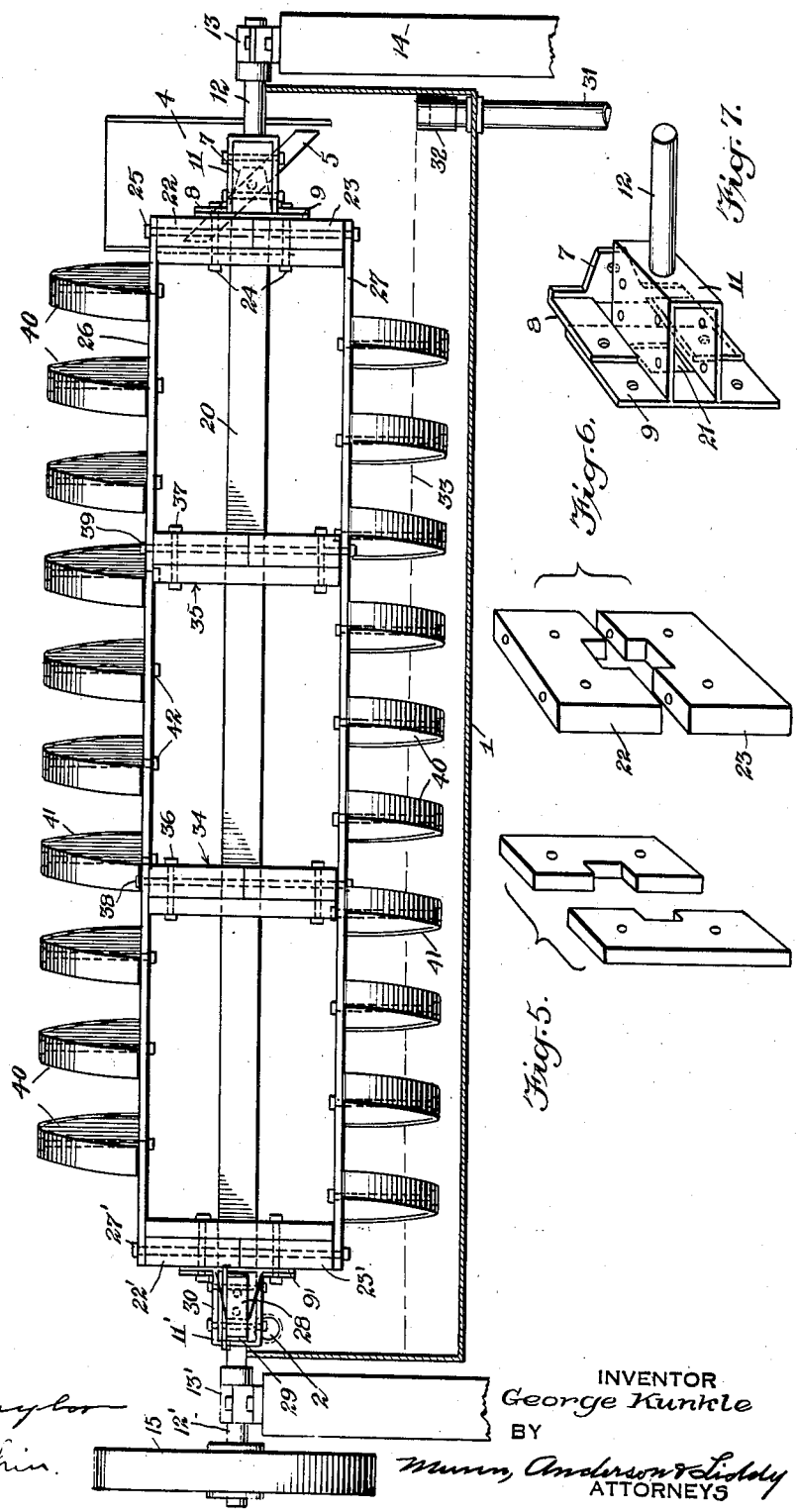
Fig. 1 is a longitudinal vertical sectional view through a concentrating machine disclosing an embodiment of the invention.

Referring to the accompanying drawings by numerals, 1 indicates a tank which is preferably semi-tubular and preferably and desirably made of steel. This tank is also preferably several times as long as it is wide, as illustrated particularly in Fig. 2. At one end of the tank a pipe 2 admits water or other reagent for use in the floatation method.

Substantially diametrically opposite the entrance place of pipe 2 is an outlet member or discharge chute 3 for discharging the refuse or tailings left over after the material has traveled for substantially the full length of the tank 1. At the inlet end of the tank there is provided an inlet chute or member 4 through which ground or powdered ore from a ball mill is fed. This ore moves down into the tank 1 under the action of gravity and the flow thereof is regulated by a gate or shutter 5, which gate is preferably of wood and preferably rotatably mounted on a rod or bar 6 carried by the foot or bent end 7 of bracket 8 secured to an end plate 9 by suitable bolts 10. Preferably the bolts 10 are tightened to provide sufficient friction to hold the gate 5 in any desired adjusted position to vary the flow of ore to the tank. A substantially U-shaped structure 11 is welded or otherwise rigidly secured to plate 9 and the bracket 8 straddles member 11, as shown in Fig. 7. A journal shaft 12 is secured to the power end of the U-shaped housing 11 by welding or in any other desired way. This journal shaft is journaled in a suitable bearing 13 on a standard or support 14. At the outlet end a similar structure is presented so that a shaft 12' may be readily journaled in a journal member 13' and may support a pulley wheel 15. A plate is applied to the pulley wheel 15 to rotate the shaft 12 and associated parts at any desired speed. It will be understood that power is transmitted from shaft 12' to the U-shaped housing 11 through the filling blocks 16 and 17, held in place by bolts 18 and 19 to a square shaft 20. Shaft 20 extends through a square hole 21 in the plate 9' and also in plate 9, as shown particularly in Figs. 3 and 4. The shaft 20 transmits power from the shaft 12' to shaft 12 and to all the parts therebetween. As shown particularly in Fig. 1, a pair of wooden blocks 22 and 23 surround the shaft 20 near plate 9 and are bolted to this shaft by suitable bolts 24. In addition, a pair of bolts 25 extend through the blocks 22 and 23 for holding these blocks together and tightly pinched to shaft 20. In addition, the bolts 25 secure shoe boards 26 and 27 to the respective blocks 22 and 23 at one end. At the opposite end the shoe boards are connected by suitable bolts 27 to blocks 22' and 23'.

It will be understood that both ends of the device are constructed identically except that at the inlet end the gate or shutter 5 is provided, while at the outlet end the bracket 7 is bolted or otherwise rigidly secured to a steel U-bar or other member 28. This member has a short angle bar 29 secured thereto at each side, which angle bar is secured to a plate 30, which plate preferably extends a short distance beyond the member 28. The construction of members 28 to 30, inclusive, forms, in a certain sense, a flat scoop which rotates with shaft 20 so that upon revolution of shaft 20 some of the residue or tailings are raised and thrown out through the shutter or outlet member 3.

During the operation of the machine preferably a small quantity of water or other reagent is being continually fed into the trough or tank 1 through pipe 2, and an equal quantity together with the floated materials passes out through the outlet member or pipe 31 shown in Fig. 1. A tubular sleeve or nipple 32 surrounds the upper end of pipe 31. This sleeve is preferably rubber and thereby automatically holds itself in any adjusted position. The height of the upper end of this sleeve regulates the level of fluid in the tank 1, which level is indicated in Fig. 1 by the dash lines 33.

Figure 2:
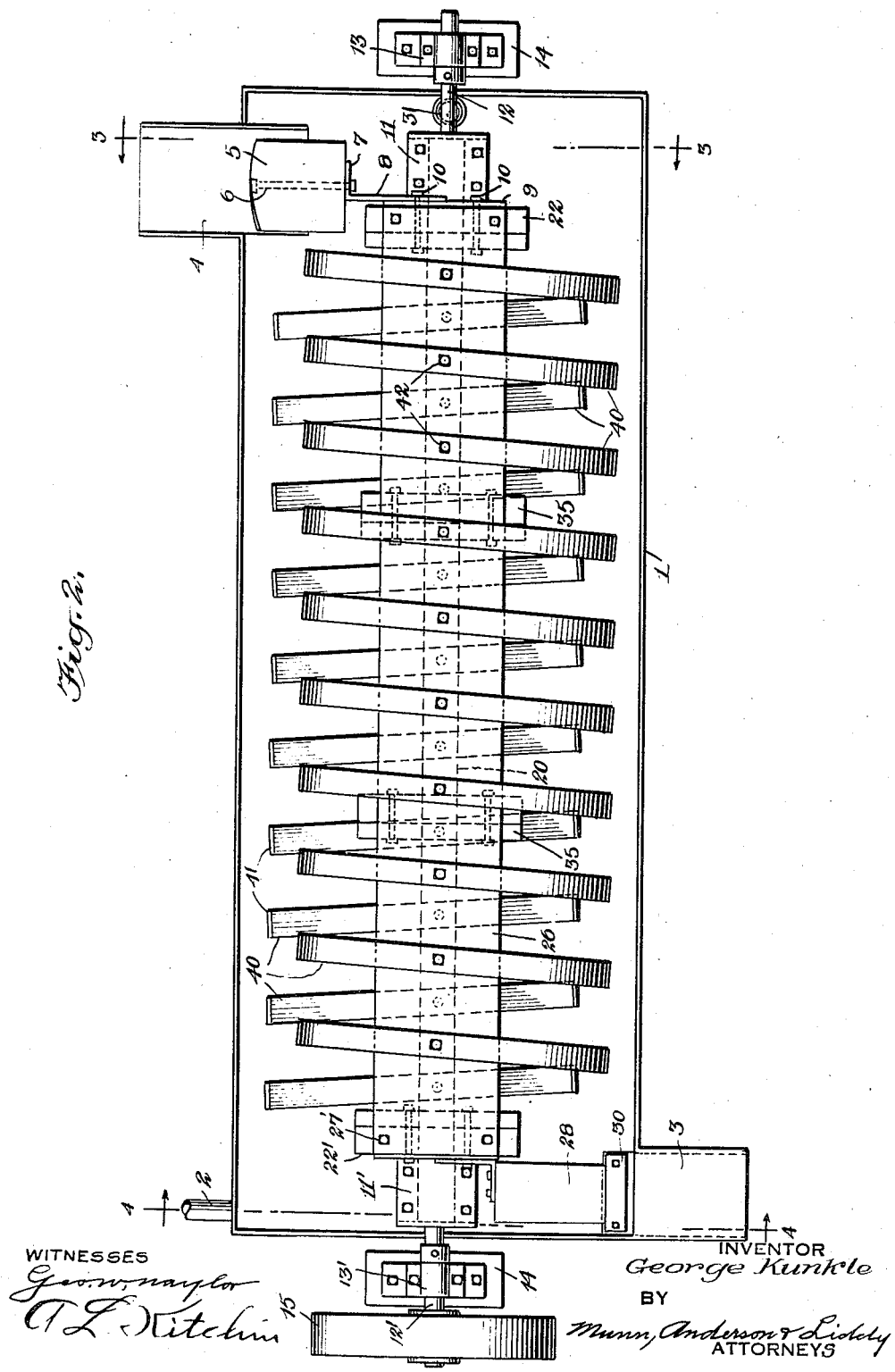
Fig. 2 is a top plan view of the machine shown in Fig. 1.

Intermediate the ends of the device there are provided bracing members 34 and 35 which are identical with the structure shown in Figs. 5 and 6. The respective members 34 and 35 have the parts secured together by the respective bolts 36 and 37 and by the transverse bolts 38 and 39, which latter bolts extend from one shoe board to the other. On each shoe board there are provided a plurality of shoes 40, which are preferably formed from wood and which also preferably are covered on their peripheral faces with a yielding covering 41, as shown in Fig. 4a. The covering or coating 41 is preferably rubber in a somewhat resilient state, but may be a mixture of rubber and fabric, or may be a piece of heavy fabric. As indicated in Fig. 2, the various shoes 40 on each of the shoe boards are arranged in alignment and each shoe has a single bolt 42 arranged centrally thereof. The respective bolts 42 extend through the respective shoes and through the shoe boards with which they are connected, as illustrated in Fig. 1. This permits the boards to be arranged at various angles, as, for instance, the angle shown in Fig. 2. These boards are adapted to move clockwise when looking at the same from the right-hand end, as shown in Figs. 1 and 2.

Figure 3:
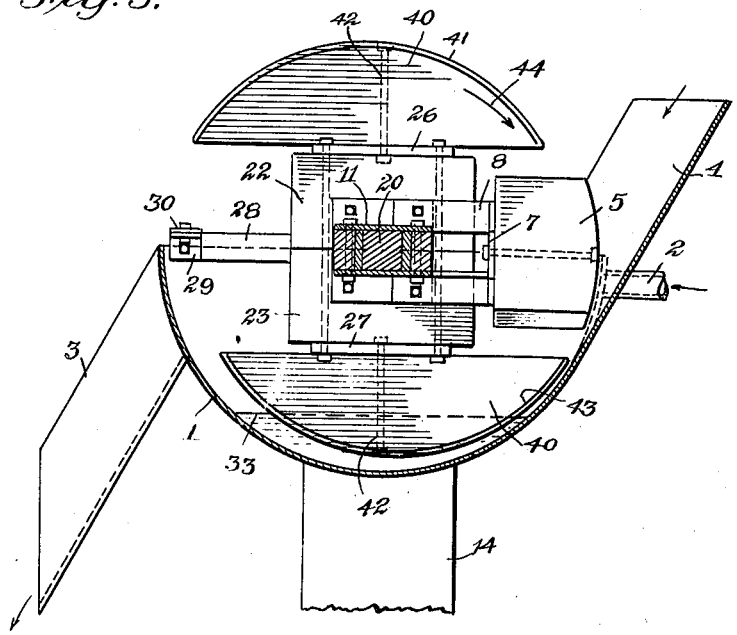
Fig. 3 is a transverse sectional view through Fig. 2 approximately on the line 3—3.
Figure 4:
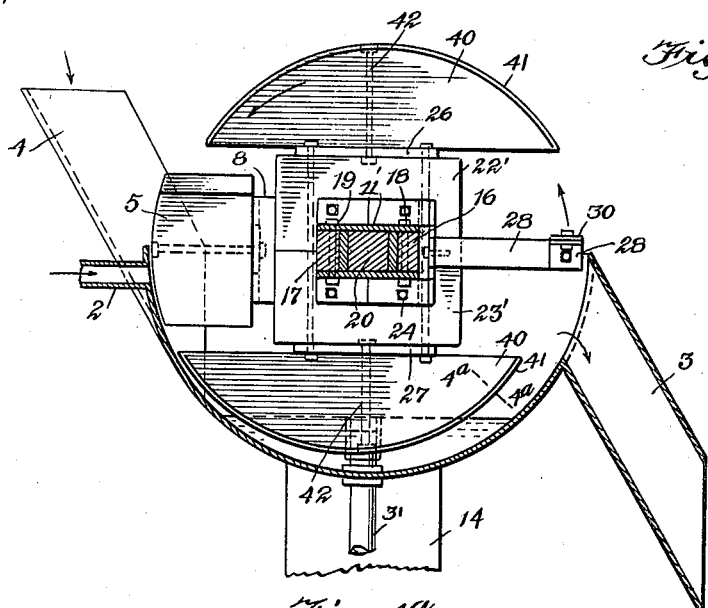
Fig. 4 is a transverse sectional view through Fig. 2 approximately on the line 4—4.
Figure 4A:

In positioning the various shoes on the respective shoe boards they are arranged as shown particularly in Figs. 3 and 4, namely, offset somewhat so that the respective portions 43 will be very near the inner surface of the tank 1, while the opposite ends are spaced appreciably therefrom. As the shoes rotate, as indicated by the arrows 44 in Fig. 3, the pressure on the ore gradually increases from the time the shoe enters the tank and the time it leaves. Also by this arrangement there is provided a seal when the shoes are submerged, said seal forming a water-trap in each momentarily formed compartment as the two series of shoes function. This prevents churning of the water and also prevents churning of the sediment toward the discharge end of the tank, but allows the matter in suspension to flow gradually toward the outlet pipe 31.

In treating the ore in the concentrator, it is desired to remove as much of the silica and other undesirable material as possible so that the material discharged through the pipe 31 will have a rich ore base with which to function. Owing to the two or double construction of the shoe boards 26, with a row of shoes set in line, a structure is presented which will form compartments twice for every revolution of the wood shaft 20 so that, in a certain sense, the shoes 40 form a series of hydrostatic valves which hold and release at the right time the sediment-bearing solutions. These solutions are carried to the discharge pipe 31 and from this pipe the solutions are allowed to settle in suitable sediment tanks.

By reason of the location of the shoes, as shown in Figs. 3 and 4, all the shoes will gradually increase in pressure against the ore from toe to heel as the shaft 20 rotates. By thus causing the shoes to push or move through the ore pulp and water clockwise, a desired maximum scouring and minute differential crushing is secured. It will be evident that the pressure exercised by the shoes is regulated principally by the speed of feed from the ball mill and the degree of angle of the shoes. This also regulates the speed of the passages of the ore from the inlet end of the tank to the outlet end.

When the rubber pads or coverings 41 wear out, new coverings may be supplied as needed. These pads may be held in place by cement, nails, or otherwise.

It will be seen from the above description that ground or powdered ores from ball mills or other suitable mills is fed to the inlet member or chute 4. If the feed from the ball mill is irregular, the gate or shutter 5 may be manually swung over to check the flow of incoming material. As soon as the material enters it is acted on by the various shoes 40 and the undesirable part gradually worked or moved toward the discharge end and as it reaches the discharge end the scoop 28 upon each revolution of shaft 20 throws a certain quantity into the discharge chute or outlet member 3. The desirable part with a large percentage of water or other reagent is moved down to and out through the pipe 31 to a suitable settling tank.

If desired, the device could continually function, that is it could operate for twenty-four hours per day and would continue to discharge the tailings out through the chute 3 and the desirable material out through the pipe 31. Also the device could be operated for short periods of time and started and stopped without any injury thereto or without affecting the material being treated.

I claim:

1. An ore concentrating machine including a semitubular tank, a rotatable shaft extending longitudinally of the tank near the top thereof, a pair of oppositely positioned shoe boards arranged parallel to the shaft and secured thereto but spaced therefrom, a row of spaced shoes on each of said boards adapted to act on the ore in said tank, each of said shoes being substantially half a disk and positioned so that one row of shoes enters said tank at a time, means for directing ground ore into said tank at one end, means at the other end for removing the tailings, means for directing a liquid reagent into said tank at the discharge end, and means for directing the floated matter from said tank at the ore inlet end.

2. An ore concentrating machine including a semi-tubular tank, a shaft extending longitudinally of the tank near the top center thereof, a plurality of hub members secured to said shaft at spaced points, a pair of oppositely positioned shoe boards connected to said hub members and arranged parallel to said shaft and to each other, a row of half-disk shaped shoes secured to each of said boards with the flat sides of the half-disk shaped shoes fitting flatwise against the shoe boards, the side surfaces of said shoes being at an angle other than a right angle to the respective shoe boards, means for rotating said shaft, shoe boards and shoes whereby the shoes of each board will enter and leave the tank as a unit, means for directing ore to be treated into said tank at the inlet end, means for directing liquid into the tank at the outlet end and tubular means at the inlet end for directing the floated matter from the tank.

GEORGE KUNKLE.